Patented Aug. 26, 1952

2,608,574

UNITED STATES PATENT OFFICE 2,608,574

ALKAMINE ESTERS OF 4-ALKYLAMINO-THIOLBENZOIC ACIDS

Raymond O. Clinton, Delmar, N. Y., assignor to Sterling Drug Inc., New York, N. Y., a corporation of Delaware No Drawing. Application February 12, 1949, Serial No. 76,190

13 Claims. (Cl. 260—293.4)

1

This invention relates to basic thiol esters, salts thereof, and to processes for preparing the same. It more particularly relates to alkamine esters of 4-alkylaminothiolbenzoic acid, and to water-soluble acid addition salts of the same.

The basic thiol esters of this invention have the general formula.

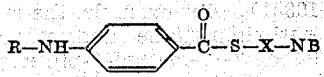

where R is an alkyl or hydroxyalkyl group, X is a lower alkylene group, and NB is a lower aliphatic tertiary amino group. These esters, preferably in the form of their water-soluble acid addition salts, have been found to exhibit valuable pharmacological properties, in particular, local anesthetic properties.

In the foregoing general formula, the alkyl or hydroxyalkyl group, represented by R, preferably has from 3 to 7 carbon atoms, representative and illustrative examples being n-propyl, isopropyl, n-butyl, 2-amyl, n-heptyl, 2-hydroxy-1-propyl, 6-hydroxyhexyl, and the like. The lower alkylene group, represented hereinabove as X, preferably has from 2 to 4 carbon atoms, including such examples as —CH₂CH₂—, —CH₂CH₂CH₂—,

—CH₂CH₂CH₂CH₂—, —CH₂CH(CH₃)CH₂—, and the like. The lower aliphatic tertiary-amino group, shown above as NB, comprehends lower dialkylamino groups illustrated by examples such as dimethylamino, diethylamino, ethylmethylamino, di-n-butylamino, and the like; and lower saturated N-heteromonocyclic groups having 5 to 6 ring atoms illustrated by examples such as 1-piperidyl, 2 - methyl - 1-piperidyl, 3 - methyl - 1 - piperidyl, 2,6 - dimethyl - 1 - piperidyl, 1 - pyrrolidyl, 2 - methyl - 1 - pyrrolidyl, 4 - morpholinyl, and the like. In other words, BNH designates a lower aliphatic secondary-amine as illustrated by diethylamine, di-n-butylamine, 4-methylpiperidine, morpholine, and the like.

Specific illustrations of the basic thiol esters of my invention follow:

(1) 2-diethylaminoethyl 4-(2-butyl)aminothiolbenzoate

(2) 3-(2-methyl-1-pyrrolidyl)propyl 4-n-propylaminothiolbenzoate

2

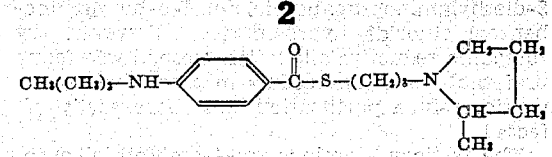

(3) 4-dimethylaminobutyl 4-n-hexylaminothiolbenzoate

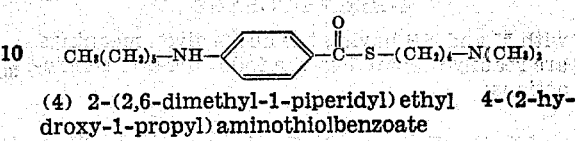

(4) 2-(2,6-dimethyl-1-piperidyl)ethyl 4-(2-hydroxy-1-propyl)aminothiolbenzoate

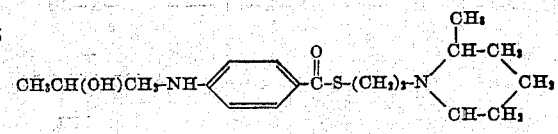

(5) 3-(4-morpholinyl)propyl 4 - n - butylaminothiolbenzoate

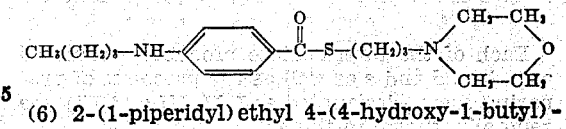

(6) 2-(1-piperidyl)ethyl 4-(4-hydroxy-1-butyl)-aminothiolbenzoate

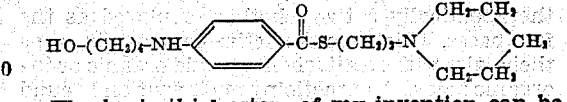

The basic thiol esters of my invention can be prepared by various methods. The method preferred in practicing my invention involves reductive alkylation of a tertiary-aminoalkyl 4-aminothiolbenzoate of the formula

where X and NB have the meanings designated hereinabove, with an alkanal or hydroxyalkanal. An illustration is the formation of 2-diethylaminoethyl 4 - n - propylaminothiolbenzoate by treating the corresponding alkamine 4-aminothiolbenzoate with propionaldehyde in a reducing medium. Illustrative of this method utilizing a hydroxyalkane carbonyl compound is the formation of 3-(1-piperidyl)propyl 4-(3-hydroxy-1-butylamino)thiolbenzoate by treating 3-(1-piperidyl)propyl 4 - aminothiolbenzoate with 3 - hydroxy-1-butanal in a reducing medium, such as zinc dust and acetic acid, iron and acetic acid, or a catalytic reducing medium using a sulfur-insensitive catayst, e. g. molybdenum sulfide.

Another style of synthesis of the thiol esters of my invention is the direct alkylation of a tertiary-aminoalkyl 4-aminothiolbenzoate of formula, 4-H₂NC₆H₄COSXNB, 4-H₂NC₆H₄CSOXNB, given above, with alkylating agents such as n-propyl bromide, isobutyl iodide, 4-hydroxybutyl chloride, and the like, in the presence of a hydrogen halide acceptor, e. g. sodium bicarbonate, potassium carbonate, etc.

Another mode of synthesis of the thiol ester hydrohalides where R is alkyl is based on the reaction between a tertiary-aminoalkanethiol of the formula, BNXSH, and a 4-alkylaminobenzoyl halide hydrohalide of the formula

4-RNHC₆H₄COY·HY where R is a lower alkyl group and Y is halogen, preferably Cl or Br. Illustrative of this synthesis is the formation of 3-diethylaminopropyl 4-n-butylaminothiolbenzoate dihydrochloride from 3-diethylaminopropanethiol and 4-n-butylaminobenzoyl chloride hydrochloride. However, the foregoing reductive alkylation method was found preferable to this procedure in practicing my invention, since purification was more easily effected.

The tertiary - aminoalkyl-4-aminothiolbenzoates, designated hereinabove as

4-H₂NC₆H₄COSXNB with X and NB having the above given meanings, are readily prepared by the following series of reactions:

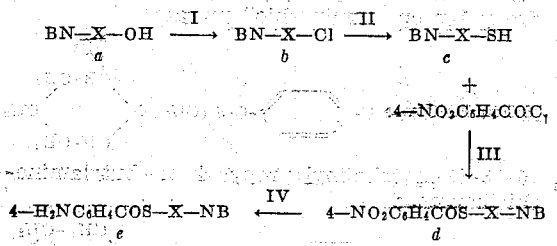

Each of the intermediate products designated as a, b, c, d and e as well as the processes of preparing them (designated as I, II, III and IV) are generally known in the art.

The alkamine thiol esters of my invention are therapeutically active whether employed as the free bases, which are the active compounds, or as their salts with relatively non-toxic organic or inorganic acids. In practicing my invention I found it convenient to isolate the basic esters as their hydrochlorides, citrates, or phosphates. However, other acid addition salts are within the scope of my invention. Such additional salts include the dihydrobromide, sulfate, sulfamate, tartrate, succinate, diacetate, dibenzoate, dioleate, and the like.

The following examples will further illustrate specific embodiments of the invention.

EXAMPLES

*Tertiary-aminoalkanols*

Substantial improvements in yield were made in the synthesis of certain tertiary-aminopropanols through modifications of the conventional secondary amine-trimethylene chlorohydrin procedure of Adams et al. (J. A. C. S. 59, 2249 (1937)). This synthesis is illustrated by the following preparation of 3-(2-methyl-1-piperidyl)-propanol:

A mixture of 770 g. of 2-methylpiperidine, 368 g. of trimethylene chlorohydrin, 800 ml. of absolute alcohol and 30 g. of sodium iodide or potassium iodide, was refluxed with stirring for twenty-four hours. The stirred reaction mixture, after cooling, was treated with a solution of 90 g. of sodium in 1500 ml. of absolute alcohol, filtered, and the filtercake washed well with ether. The filtrate was distilled at atmospheric pressure, with mechanical stirring, through a twelve-inch Vigreux column to a head temperature of 122° C., reserving the fraction of B. P. 105–122° C. for recovery of 2-methylpiperidine. The still residue was diluted with about three volumes of ether, filtered, and distilled, first at atmospheric pressure and then in vacuo. Redistillation gave 582 g. (95% yield based on trimethylene chlorohydrin or 92% yield based on recovered 2-methylpiperidine) of 3-(2-methyl-1-piperidyl) propanol, B. P. 105–108° C. at 10–11 mm.; $n_D^{25}$ 1.4769.

In a similar manner using morpholine in place of 2-methylpiperidine 3-(4-morpholinyl) propanol was prepared in 92% yield (twice distilled), B. P. 109–111° C. at 7–8 mm., $n_D^{25}$ 1.4745; and using piperidine, 3-(1-piperidyl)-propanol was prepared in 93% yield (twice distilled), B. P. 93.5–95° C. at 9 mm., $n_D^{25}$ 1.4755.

Tertiary-aminoethanols were conveniently prepared by reacting the appropriate secondary amine with ethylene oxide in boiling methanol by a method similar to that of Pollard (J. A. C. S. 57, 1988 (1935)). For example, the reaction between 2-methylpiperidine and ethylene oxide yielded 86% of 2-(2-methyl-1-piperidyl)ethanol as a colorless, slightly viscous oil, B. P. 98–100° C. at 15 mm., $n_D^{25}$ 1.4782. A sample redistilled for analysis had a B. P. of 87.0° at 8 mm., $n_D^{25}$ 1.4788. 2-(2-methyl-1-pyrrolidyl)ethanol, B. P. 72° C. at 8 mm. and $n_D^{25}$ 1.4683, was obtained using the same procedure with 2-methyl-1-pyrrolidine as the secondary amine.

*Tertiary-aminoalkyl chlorides*

These intermediate basic alkyl chlorides can be prepared by any known method. I found it convenient to treat the foregoing described tertiary-aminoalkanols with thionyl chloride in the usual manner. Thus, when the basic alkanol was 2-(2-methyl-1-piperidyl)ethanol the resulting chloride, obtained in 98% yield, was 2-(2-methyl-1-piperidyl)ethyl chloride hydrochloride, white needles from isopropanol, M. P. 184–185° C. 2-(2-methyl-1-piperidyl)ethyl chloride, which was liberated from the hydrochloride by sodium hydroxide, is a colorless mobile oil, B. P. 88.0° C. at 16 mm., $n_D^{25}$ 1.4721.

Other alkamine chlorides prepared by treating the corresponding basic alkanol with thionyl chloride in the usual manner were 2-(2-methyl-1-pyrrolidyl)ethyl chloride hydrochloride, M. P. 187–188° C. and 3-(2-methyl-1-piperidyl)propyl chloride hydrochloride, M. P. 177.2–178.2° C. (shiny plates from isopropanol-ether).

*Tertiary-aminoalkanethiols*

The new basic thiols used in the instant application were prepared by methods previously described (Clinton et al., J. A. C. S. 70, 950 (1948)). For example, reaction between 2-(2-methyl-1-piperidyl)ethyl chloride and thiourea in absolute ethanol gave a 94% yield of 2-(2-methyl-1-piperidyl)ethylisothiouronium chloride hydrochloride, white needles from absolute ethanol, M. P. 226–227° C. The latter compound, on hydrolysis, gave a 57% yield of 2-(2-methyl-1-piperidyl)ethanethiol, colorless liquid, B. P. 96.5–97.0° C. at 14 mm., $n_D^{25}$ 1.4974.

2-(2-methyl-1-pyrrolidyl)ethyl chloride hydrochloride gave with thiourea in absolute ethanol a 96% yield of 2-(2-methyl-1-pyrrolidyl)ethylisothiouronium chloride hydrochloride, white needles from isopropanol, M. P. 205–208° C. From this isothiouronium salt was obtained a 44% yield of 2-(2-methyl-1-pyrrolidyl)ethanethiol as a colorless mobile liquid, B. P. 74.0–74.5° C. at 11 mm., $n_D^{25}$ 1.4898.

3-(4-morpholinyl)propyl chloride hydrochloride (Adams and Whitmore, J. A. C. S. 67, 735 (1945)) and thiourea in absolute ethanol gave a 95% yield of 3-(4-morpholinyl)propylisothiouronium chloride hydrochloride, white needles from absolute ethanol, M. P. 218–220° C. By the water method (Clinton et al., J. A. C. S. 70, 950 (1948)) there was obtained a 42% yield of 3-(4-morpholinyl)propanethiol, colorless mobile oil, B. P. 110–112° C. at 11–12 mm., $n_D^{25}$ 1.4962.

3-(2-methyl-1-piperidyl)propyl chloride hydrochloride and thiourea in absolute ethanol gave a 97% yield of 3-(2-methyl-1-piperidyl)propylisothiouronium chloride hydrochloride, white prisms from absolute ethanol-petroleum ether, M. P. 186–188° C. By the water method (see above) there was obtained a 53% yield of 3-(2-methyl-1-piperidyl)propanethiol, B. P. 95.5° C. at 6 mm., $n_D^{25}$ 1.4950.

Tertiary-aminoalkyl 4-nitrothiolbenzoates

These basic esters were prepared by reacting 4-nitrobenzoyl chloride with the appropriate tertiary-aminoalkanethiol in cold benzene [Albertson and Clinton, J. A. C. S. 67, 1222 (1945)] or in a chloroform-water-sodium bicarbonate admixture (Clinton et al., J. A. C. S. 70, 950 (1948)). These esters, in the form of their hydrochlorides, have the following general formula

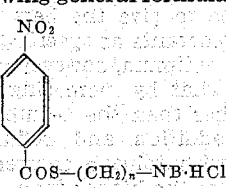

COS—(CH₂)ₙ—NB·HCl where $n$ and NB have the following meanings:

| $n$ | NB | M. P., °C. (corr.) |
|---|---|---|
| 2 | N(CH₃)₂ | 191.6–194.2 [1] |
| 3 | N(CH₃)₂ | 125–127 |
| 4 | N(C₂H₅)₂ | 160.5–162 |
| 2 | NC₄H₈O [2] | 209.6–211 |
| 3 | NC₄H₈O [2] | 201–202 [3] |
| 2 | NC₅H₁₀ [4] | 175–176.6 |
| 3 | NC₅H₁₀ [4] | 206–207.5 |
| 2 | NC₆H₁₂ [5] | 163.5–165.9 |
| 3 | NC₆H₁₂ [5] | 184–186 |
| 2 | NC₅H₁₀ [6] | 171.4–172 [7] |

[1] Reported M. P. 187° (dec.) (Renshaw et al., J. A. C. S. 60, 1765 (1938)).
[2] 4-morpholinyl.
[3] The base crystallized in pale yellow needles from dilute ethanol, M. P. 62.5–64.0° C.
[4] 1-piperidyl.
[5] 2-methyl-1-piperidyl.
[6] 2-methyl-1-pyrrolidyl.
[7] The base melted at 53–55° C. (from petroleum ether).

Tertiary-aminoalkyl 4-aminothiolbenzoates

These basic esters were prepared by reduction of the corresponding 4-nitrothiolbenzoates described hereinabove. The reduction was preferably carried out by a method similar to that of West (J. A. C. S. 127, 495 (1925)), since the ferrous sulfate-ammonia method (Clinton et al., J. A. C. S. 70, 950 (1948)) offered no evident advantages in this case. Certain of the resulting tertiary-aminoalkyl 4-aminothiolbenzoates were obtained crystalline. These basic esters prepared as hereinabove described have the general formula

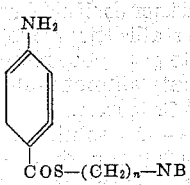

COS—(CH₂)ₙ—NB where $n$ and NB have the following meanings:

| $n$ | NB | M. P., °C. | Phosphate— M. P., °C. |
|---|---|---|---|
| 2 | N(CH₃)₂ | | 187–189.2 |
| 3 | N(C₂H₅)₂ | | 209.8–210.6 |
| 4 | N(C₂H₅)₂ | | 199.2–200.8 |
| 2 | NC₄H₈O [1] | 161–162 [2] | 207–208 |
| 3 | NC₄H₈O [1] | | 129–135.6 |
| 2 | NC₅H₁₀ [3] | 122.5–123.5 [4] | 204–206 |
| 3 | NC₅H₁₀ [3] | (5) | 210–211.2 |
| 2 | NC₆H₁₂ [6] | 98.5–99.5 [7] | 196.7–197.8 |
| 3 | NC₆H₁₂ [6] | | 223.4–224.0 [8] |
| (9) | N(C₂H₅)₂ | | 147–151 |

[1] 4-morpholinyl.
[2] White leaflets from a large volume of benzene or blunt prisms from absolute ethanol.
[3] 1-piperidyl.
[4] Long white needles from petroleum ether.
[5] Base crystallized from dilute ethanol as an unstable hydrate, M. P. 78–80° C., and from benzene-petroleum ether in the anhydrous form, M. P. 60–61° C.
[6] 2-methyl-1-piperidyl.
[7] Large white feathery needles from petroleum ether.
[8] Flavianate, with a base to flavianic acid ratio of 3 to 2.
[9] NB—X— or the tertiary-aminoalkyl group here is 5-diethylamino-2-pentyl.

Tertiary-aminoalkyl 4-alkylaminothiolbenzoates

The tertiary-aminoalkyl 4-alkylaminothiolbenzoates of my invention were prepared either by alkylation of the corresponding basic 4-amino compounds, or directly from a 4-alkylaminobenzoyl chloride hydrochloride and a dialkylaminoalkanethiol. The preferred method, wherein purification was more easily effected, was that of reductively alkylating the corresponding alkamine 4-aminothiolbenzoates with an aldehyde in the presence of zinc dust and acetic acid. The basic esters thus obtained were, in most cases, mobile, pale yellow oils which readily yielded crystalline salts. Exemplary of this procedure is the following preparation of 2-diethylaminoethyl 4-n-butylaminothiolbenzoate.

*2-diethylaminoethyl 4-n-butylaminothiolbenzoate.*—To a refluxing, stirred mixture of 20.0 g. of 2-diethylaminoethyl 4-aminothiolbenzoate, 20.6 g. of zinc dust (4 mole proportion), 19.5 g. of glacial acetic acid (4.1 mole proportion) and 80 ml. of benzene there was added dropwise during twenty minutes a solution of 6.9 g. of n-butyraldehyde (1.2 mole proportion) in 20 ml. of benzene. Refluxing and stirring were continued for an additional one hour. The mixture was filtered while hot, and the filter cake was washed thoroughly with hot benzene and with dilute acetic acid. The filtrate was made basic to litmus with dilute sodium hydroxide solution, clarified by re-filtration, and the benzene layer separated. The aqueous layer was twice re-extracted with benzene, the combined benzene extracts were washed once with water, and dried over Drierite. Evaporation in vacuo yielded, as a mobile yellow oil, 23.0 g. of 2-diethylaminoethyl 4-n-butylaminothiolbenzoate.

*Citrate.*—A solution of 19.3 g. of the above base, 2-diethylaminoethyl 4-n-butylaminothiolbenzoate, and 13.2 g. of citric acid monohydrate in 100 ml. of warm absolute alcohol was cooled and diluted to turbidity with ethyl acetate. On scratching and further cooling the citrate crystallized. Two recrystallizations from absolute alcohol-ethyl acetate gave pure material, 2-diethylaminoethyl 4-n-butylaminothiolbenzoate citrate, M. P. 149.5–150.5° C. (corr.).

*Dihydrochloride.*—A solution of 2-diethylaminoethyl 4-n-butylaminothiolbenzoate in ethyl acetate was treated with an excess of ethereal hydrogen chloride. The solvents were decanted from the precipitated gum, and the latter was crystallized from isopropanol in the presence of a small amount of ethereal hydrogen chloride. Recrystallization from isopropanol (HCl present) gave white prisms of 2-diethylaminoethyl 4-n-butylaminothiolbenzoate dihydrochloride, M. P. 142.6–145.6° C. (corr.).

Other tertiary-aminoalkyl 4-n-butylaminothiolbenzoates prepared according to the above described procedure using n-butyraldehyde and the appropriate alkamine 4-aminothiolbenzoate are those having the general formula

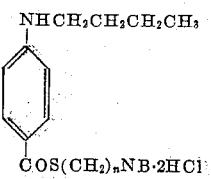

where $n$ and NB have the following meanings:

| n. | NB | M.P., °C. |
|---|---|---|
| 2 | N(CH$_3$)$_2$ | 157–161.5 |
| 2 | N(C$_2$H$_5$)$_2$ | 142.6–145.6 |
| 2 | N(C$_2$H$_5$)$_2$ | 154.6–156[1] |
| 3 | N(C$_2$H$_5$)$_2$ | 138–139.8 |
| 4 | N(C$_2$H$_5$)$_2$ | 103.2–107 |
| 2 | NC$_4$H$_8$O[2] | 196.4–199.2[3] |
| 3 | NC$_4$H$_8$O[2] | 192.6–127.2[4] |
| 2 | NC$_5$H$_{10}$[5] | 200.4–203.4[6] |
| 3 | NC$_5$H$_{10}$[5] | 186–188.4 |
| 2 | NC$_6$H$_{12}$[7] | 112.5–124.5[8] |
| 3 | NC$_6$H$_{12}$[7] | 170.8–173.4[9] |

[1] Citrate instead of dihydrochloride.
[2] 4-morpholinyl.
[3] Base formed white plates from benzene petroleum ether; M. P. 67–68° C.
[4] Crude base had M. P. 50–52° C. (from benzene petroleum ether).
[5] 1-piperidyl.
[6] Base crystallized from petroleum ether in small white prisms; M. P. 65.5–67.0° C.
[7] 2-methyl-1-piperidyl.
[8] Sesquiphosphate instead of dihydrochloride.
[9] The picrolonate, orange prisms from absolute ethanol-petroleum ether, melted at 134–137° C.

Other alkamine 4-alkylaminothiolbenzoates prepared according to the foregoing described reductive alkylation method include the following:

2-diethylaminoethyl 4-n-propylaminothiolbenzoate, from the corresponding 4-amino ester and propionaldehyde; the picrate crystallized from alcohol in canary yellow needles, M. P. 129.5–131.5° C. 2-diethylaminoethyl 4-n-propylaminothiolbenzoate dihydrochloride, crystallized from absolute alcohol-acetone-ethyl acetate in massive, pale yellow prisms, melts at 152.4–153.5° C.

2-diethylaminoethyl 4-n-heptylaminothiolbenzoate citrate, prepared from the base (reductive alkylation with n-heptaldehyde) and citric acid monohydrate in acetone, crystallized in rosets of tiny white needles from absolute alcohol-ethyl acetate, M. P. 123–124° C. (dec.).

Preparation of my compounds where R is hydroxyalkyl can be effected by the above described reductive alkylation method. In such a preparation, I found it desirable to extend the reflux-stirring period (after addition of the hydroxyalkanal) to about two hours to insure complete alkylation. The following compound is exemplary of such an alkamine 4-hydroxyalkylaminothiolbenzoate prepared by the above-described reductive alkylation method:

*2 - diethylaminoethyl 4 - (5 - n - hydroxyamylamino) thiolbenzoate.*—This preparation was carried out according to the above-described procedure used in preparing 2-diethylaminoethyl 4-n-butylaminothiolbenzoate save the following reactants and quantities thereof were used: 25.2 g. of 2-diethylaminoethyl 4-aminothiolbenzoate, 26.2 g. of zinc dust, 24.6 g. of glacial acetic acid, 150 ml. of benzene, and 12.4 g. of 5-hydroxypentanal in 20 ml. of benzene. Refluxing and stirring were continued for two hours after addition of the 5-hydroxypentanal was completed. Removal of the benzene from the dried benzene extracts yielded a solid, which when recrystallized from benzene-n-hexane formed large white prisms of 2-diethylaminoethyl 4-(5-hydroxy-n-amylamino)thiolbenzoate, M. P. 72.3–73.6° C. The picrate formed tiny orange-yellow needles from alcohol, M. P. 96.6–98.2° C. 2-diethylaminoethyl 4 - (5 - n-hydroxyamylamino) thiolbenzoate phosphate, prepared by admixture of equimolecular amounts of the basic ester and phosphoric acid in acetone, crystallized from alcohol-acetone in rosets of white cottony needles, M. P. 163.6–164.4° C.

In the foregoing described reductive alkylation procedure, other reaction solvents such as toluene, xylene, chloroform, butyl ether, dioxane, and the like, can be used in place of benzene; however I found benzene to give the best results. The mole ratios of reactants as specified in the above preparation are optimum, however said ratios can be varied somewhat by increasing the amounts of reactants other than the 4-amino compound. The aldehyde-addition and reflux times are variable, i. e., with toluene shorter reflux time suffices because of the higher temperature of the reaction medium.

My compounds where R is alkyl also can be prepared by reacting an alkamine thiol with a 4-alkylaminobenzoyl halide hydrohalide. The following preparation is illustrative of this method:

*2-diethylaminoethyl 4-n-amylaminothiolbenzoate.*—Reductive alkylation of ethyl 4-aminobenzoate with n-valeraldehyde gave a 95% yield of ethyl 4-amylaminobenzoate, white prisms from n-hexane, M. P. 54.0–55.0° C. Saponification of the ester with aqueous-ethanolic sodium hydroxide solution gave a 99% yield of 4-n-amylaminobenzoic acid, white needles from dilute ethanol, M. P. 135.5–136.5° C. This acid was converted to the chloride hydrochloride either by the phosphorous pentachloride procedure of Graf and Langner (J. prakt. Chem., 148, 161 (1937)) or the thionyl chloride procedure of Mndzhoyan [J. Gen. Chem. (U. S. S. R.), 16, 1033 (1946) (Chem. Abstr., 41, 2737 (1947)]; the resulting 4-n-amylaminobenzoyl chloride hydrochloride was used without purification because of instability. Condensation with 2-diethylaminoethanethiol in benzene gave, after several purifications by crystallization and conversion to the base, a 45% yield of 2-diethylaminoethyl 4-n-amylamino thiolbenzoate as a pale yellow oil. The picrate formed pale orange needles from ethanol, M. P. 120.2–121.2° C. (corr.).

This same basic ester, 2-diethylaminoethyl 4-n-amylaminothiolbenzoate, was prepared according to the above described reductive alkylation method from 2-diethylaminoethyl 4-aminothiolbenzoate and n-valeraldehyde in 90% yield.

I claim:

1. A member of the group consisting of a basic thiol ester of the formula

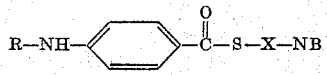

where R is a radical containing 3 to 7 carbon atoms selected from the group consisting of alkyl and hydroxyalkyl groups, X is a lower alkylene group having 2 to 4 carbon atoms and NB is a member of the group consisting of di-(lower alkyl)amino, each lower alkyl radical having 1 to 4 carbon atoms, and saturated N-heteromonocyclic groups having 5–6 ring atoms, and acid addition salts thereof.

2. An acid addition salt of a basic thiol ester of the formula

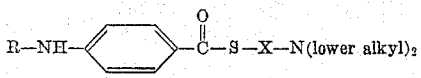

where R is a lower alkyl group having 3 to 7 carbon atoms, the lower alkyl radicals each have 1 to 4 carbon atoms and X is a lower alkylene group having 2 to 4 carbon atoms.

3. An acid addition salt of a basic thiol ester of the formula

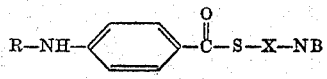

where R is a lower alkyl group having 3 to 7 carbon atoms, X is a lower alkylene group having 2 to 4 carbon atoms and NB is a lower saturated N-heteromonocyclic group having 5 to 6 ring atoms.

4. An acid addition salt of a basic thiol ester of the formula

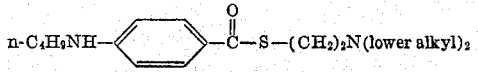

where the lower alkyl radicals each have 1 to 4 carbon atoms.

5. An acid addition salt of a basic thiol ester of the formula

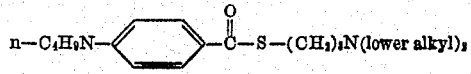

where the lower alkyl radicals each have 1 to 4 carbon atoms.

6. An acid addition salt of a basic thiol ester of the formula

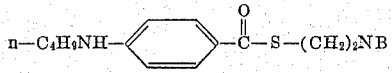

where NB is a lower saturated N-heteromonocyclic group having 5 to 6 ring atoms.

7. An acid addition salt of a basic thiol ester of the formula

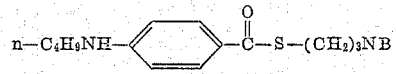

where NB is a lower saturated N-heteromonocyclic group having 5 to 6 ring atoms.

8. An acid addition salt of 2-diethylaminoethyl 4-n-butylaminothiolbenzoate.

9. An acid addition salt of 3-diethylaminopropyl 4-n-butylaminothiolbenzoate.

10. An acid addition salt of 2-dimethylaminoethyl 4-n-butylaminothiolbenzoate.

11. An acid addition salt of 2-(2-methyl-1-piperidyl)ethyl 4-n-butylaminothiolbenzoate.

12. An acid addition salt of 3-(1-piperidyl)propyl 4-n-butylaminothiolbenzoate.

13. 2-diethylaminoethyl 4-n-butylaminothiolbenozate dihydrochloride.

RAYMOND O. CLINTON.

REFERENCES CITED

The following references are of record in the file of this patent:

UNITED STATES PATENTS

| Number | Name | Date |
| --- | --- | --- |
| 820,830 | Stoltz | May 15, 1906 |
| 1,889,645 | Eisleb | Nov. 29, 1932 |
| 2,090,756 | Hansen | Aug. 24, 1937 |
| 2,298,284 | Emerson | Oct. 13, 1942 |

FOREIGN PATENTS

| Number | Country | Date |
| --- | --- | --- |
| 241,767 | Great Britain | Oct. 29, 1925 |
| 716,290 | Germany | Jan. 16, 1942 |

OTHER REFERENCES

Hansen: J. Am. Chem. Soc., vol. 55, pp. 2872–2874 (1933).